United States Patent
Krummel et al.

(10) Patent No.: US 10,062,241 B2
(45) Date of Patent: Aug. 28, 2018

(54) METHOD AND PROCESS FOR PIN ENTRY IN A CONSISTENT SOFTWARE STACK IN CASH MACHINES

(75) Inventors: Volker Krummel, Paderborn (DE); Michael Nolte, Brakel (DE); Matthias Runowski, Salzkotten (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 199 days.

(21) Appl. No.: 13/579,442

(22) PCT Filed: Feb. 3, 2011

(86) PCT No.: PCT/EP2011/051510
§ 371 (c)(1),
(2), (4) Date: Sep. 28, 2012

(87) PCT Pub. No.: WO2011/101249
PCT Pub. Date: Aug. 25, 2011

(65) Prior Publication Data
US 2013/0036467 A1   Feb. 7, 2013

(30) Foreign Application Priority Data

Feb. 19, 2010 (DE) .................. 10 2010 000 482

(51) Int. Cl.
*G07F 19/00* (2006.01)
*G06F 21/57* (2013.01)
*G06F 21/55* (2013.01)

(52) U.S. Cl.
CPC .......... *G07F 19/206* (2013.01); *G06F 21/552* (2013.01); *G06F 21/57* (2013.01);
(Continued)

(58) Field of Classification Search
CPC ... H04L 64/0853; H04L 9/3234; G06F 21/57; G07F 19/206
(Continued)

(56) References Cited

U.S. PATENT DOCUMENTS 7,309,004 B1   12/2007 Muschellack et al.
7,430,668 B1 *  9/2008 Chen et al. ................... 713/187
(Continued)

FOREIGN PATENT DOCUMENTS

CN   101320326 A   12/2008
CN   101340291 A    1/2009
(Continued)

OTHER PUBLICATIONS

International Search Report (in German with English Translation) for PCT/EP2011/051510, dated Sep. 23, 2011; ISA/EP.
(Continued)

*Primary Examiner* — Andrew Georgandellis
(74) *Attorney, Agent, or Firm* — Black, McCuskey, Souers & Arbaugh, LPA

(57) ABSTRACT

Method for checking the consistency of control software of a controller of a self-service automat having a trustworthy domain (1) that is located inside the self-service automat, comprising these steps:
  checking the control software (2) for consistency by the trustworthy domain (1)
  in the event of an inconsistency a blocking signal is generated that is used to restrict the functionality of the self-service automat.

22 Claims, 4 Drawing Sheets

(52) U.S. Cl.
CPC .......... *G06F 21/575* (2013.01); *G07F 19/211* (2013.01); *G06F 2221/2101* (2013.01); *G06F 2221/2153* (2013.01)

(58) Field of Classification Search
USPC ......................................................... 726/22
See application file for complete search history.

(56) References Cited

U.S. PATENT DOCUMENTS

| | | | |
|---|---|---|---|
| 7,493,429 B2 * | 2/2009 | Paff ...................... G06F 21/606 | |
| | | | 380/278 |
| 7,565,535 B2 * | 7/2009 | Roberts et al. ............... 713/168 | |
| 7,658,321 B1 | 2/2010 | Greco et al. | |
| 1,004,098 A1 | 2/2011 | Nolte et al. | |
| 1,017,948 A1 | 7/2011 | Le et al. | |
| 7,971,783 B1 * | 7/2011 | Crews et al. .................. 235/379 | |
| 2004/0103317 A1 | 5/2004 | Burns | |
| 2006/0200859 A1 | 9/2006 | England et al. | |
| 2007/0113062 A1 | 5/2007 | Osburn et al. | |
| 2008/0316357 A1 * | 12/2008 | Achari et al. ................. 348/564 | |
| 2010/0146264 A1 | 6/2010 | Blume et al. | |
| 2012/0102327 A1 | 4/2012 | Krummel et al. | |

FOREIGN PATENT DOCUMENTS

| | | |
|---|---|---|
| DE | 102008021046 | 10/2009 |
| EP | 0775992 | 5/1997 |
| EP | 0775992 A2 | 5/1997 |
| EP | 1980970 | 10/2008 |
| EP | 2 133 810 A2 | 12/2009 |
| WO | 00/48061 | 8/2000 |
| WO | WO-0048061 A1 | 8/2000 |

OTHER PUBLICATIONS

International Preliminary Report on Patentability (Chapter I of the Patent Cooperation Treaty) for PCT/EP2011/051510 (in English), dated Aug. 21, 2012.
Arbaugh, W.A., et al.: A Secure and Reliable Bootstrap Architecture. In: Security and Privacy, Proceedings, IEEE Symposium on, 1997, S. 65-71 Kap. 1.1, 1.2, 3.1,5.
European Search Report for Application No. 12 185 227.1 dated Mar. 14, 2014 (16 page).
Chinese Office Action for Application No. 2011-800-099-63.2 dated Oct. 10, 2014 with English translation (14 pages).

* cited by examiner

METHOD AND PROCESS FOR PIN ENTRY IN A CONSISTENT SOFTWARE STACK IN CASH MACHINES

CROSS-REFERENCE TO RELATED APPLICATIONS

This application is a National Stage of International Application No. PCT/EP2011/051510, filed Feb. 3, 2011, and published in German as WO 2011/101249 A2 on Aug. 25, 2011. This application claims the benefit and priority of German Application 10 2010 000 482.0, filed Feb. 19, 2010. The entire disclosures of the above applications are incorporated herein by reference.

BACKGROUND

This section provides background information related to the present disclosure which is not necessarily prior art.

TECHNICAL FIELD

The invention relates to a process and a device for checking the consistency of control software for a controller in a self-service automat, having a trustworthy domain that is located inside a self-service automat.

Discussion

Security touchpads are preferably used at unmanned terminals such as cash machines. Security touchpads are peripheral devices comprising a processor, memory, communication device, security circuit and software (firmware). These keypads are connected in a cash machine to a controller, e.g. conventional PC with a display unit, by way of a standard interface, e.g. USB, RS232. The security keypads perform the following basics tasks:
1. Entering the PIN of a bank customer
2. Entering other numerical values (e.g. entries of amounts)
3. Protecting the PIN that has been entered and stored
4. Performing cryptographic functions To enter the PIN, these keypads are switched into a "security mode" by the software that runs on a controller. What this mode achieves is that codes for the number keys are stored in the security memory and a defined replacement code per key stroke is reported to the controller. Conversely, in "plain text mode" the number code is reported to the controller when a key is pressed.

This combination of plain text and security mode is a known potential weak point that was able to be used to eavesdrop on the PIN. For example, malware on the controller could request the user to enter his PIN. In this case, the keypad would not be switched to the security mode and the plain text codes representing the PIN are collected by the malware.

It is always conceivable to encrypt the keypad permanently, but, because of operator demands, the possibility of plain text transmission exists. So encryption is always used when PINs are transmitted. However, if the amount of the transaction is requested when an application of the operator/the bank is used that can be run on the cash machine, the amount is transmitted in plain text. A keypad such as is used in the present invention, consists essentially of firmware that has an operating program on the one hand that undertakes basic input and output and on the other hand a sequential control system that is responsible for switching the keypad into the correct mode. A controller operates in the cash machine that is configured in one possible embodiment as a personal computer, or uses corresponding components. Control software runs on said computer that communicates with the keypad. The control software interacts over the basic input and output system (operating program), whereas the sequential control system determines the status of the keypad as a function of other parameters.

The consistency of the controller, or its control software, respectively, comes from a security domain. It must be noted that the control of present-day cash machines, in accordance with the "state of the art," is carried out by conventional PCs equipped, for example, with a Windows operating system and peripheral devices that are connected over standard interfaces such as USB (Universal Serial Bus) or RS232 (serial interface) to communicate with the PC. Because of the high degree of standardization, potential weak spots arise that can be used for infiltration using malware. An example that can be mentioned here is the planting of malware by means of a USB memory stick by a service technician.

Various application scenarios using malware are known and can be considered "state of the art."

Protective mechanisms for Windows-based PCs corresponding to the state of the art have disadvantages for use in cash machines. Examples of protective mechanisms are virus scanners or those that measure the integrity of software modules (Integrity Client). The weak spot in this, however, is the joint operating system.

The protective mechanism that is intended to protect the control software of the cash machine runs on the same operating system that is afflicted with weak spots. The mechanism can be deactivated by a technician who possesses the appropriate rights.

Furthermore, the run time characteristics are poor. Signature-based systems have an unintended influence on the transaction times of the cash machine application. Waiting time for a disbursement increases because the entire software of the controller has to be checked. If signature checks are performed in the activation phase, this phase is significantly prolonged into an unacceptable range.

All programs capable of being run on a Windows-based PC must be identified by the protective mechanism. For example, it must not be possible for a program to inject codes through a buffer overflow. This means that at least all known programs have to be checked. It is important for the software in the cash machine that non-executable files, image files for example, have to be checked. Screen requests (request for PIN entry), for example, are often filed saved in an image file. As a result of the multiplicity of different programs and files from different publishers, central solutions are almost unavoidable. These solutions allow less flexibility in software change management for the maker of the cash machine software.

The use of virus scanners represents a further disadvantage since a central function for distributing signatures is needed and said function cannot recognize malware specially developed for the cash machine.

Additional protective measures can be achieved by Integrity Client. Integrity Client provides very good protection during system operation, but offers no protection when deactivated.

Hard drive encryption can be regarded as a further alternative which protects the system when it is deactivated, but it cannot check the consistency of the software.

SUMMARY OF THE INVENTION

An object of this invention is to restrict the possibility of plain text entry in such a way that said entry is possible only when the control software is consistent. To this end, it is necessary to check the consistency of the software in a first step. A further option is to indicate to the user the consistency of the software through an LED signaling the consistency of the control software. It is also conceivable for the keypad to deactivate the system using relays or for the keypad to be deactivated. A further object is checking the consistency of the controller software.

In the inventive process for checking the consistency of control software in a controller of a self-service automat, which in one possible embodiment is a cash machine, a trustworthy domain located inside the self-service automat is used.

In one possible embodiment the secure domain is an additional operating system, which either runs on its own hardware, one example being a processor plug-in card in the self-service automat controller, or an integrated operating system that is executed before the control software starts. It is also conceivable to operate a virtual computer on the controller that represents the secure domain. However, to achieve this, the virtualization host must be hardware-based as far as possible, so that planting of defective code is prevented. For example, the secure domain can be filed in a secured memory area, such as a smart card or crypto card that is activated first when booting in order then to perform a check of the hard drive or the data carrier of the controller. Information on the smart card or crypto card can be released either through a service technician when the self-service automat boots or on the basis of hardware detection or the serial numbers of the controller.

The secure domain checks the control software for consistency and, in the event of an inconsistency, a blocking signal is generated that is used to limit the functionality of the self-service automat. Checking consistency can be carried out by signatures or hash values that the secure domain administers. Administration can similarly be carried out over a secured/encrypted area on the smart card. The smart card can be deposited in the safe.

To reduce the load, particularly when the system is starting, not all file areas are checked, or not the entire data carrier of the controller, but only relevant areas. It is also conceivable that only those files are checked that have a specific change date or one that has just been changed. It is possible to select the files or information to be checked. It is also possible that the secure domain is provided with new information or new hashes, signatures in the event that an update of the control software has been carried out. The preparation/provision of such information can be carried out by different paths.

The secure domain generates a blocking signal for a peripheral component in order to limit its functionality. This blocking signal can be a secured software flag that is given a signature so that the origin can be determined or over a dedicated line. If there is consistency, a release signal for the peripheral component is generated to activate its full functionality. In the event of inconsistency, a blocking signal is generated that limits the functionality of the peripheral component.

The corresponding signature or encryption of the signals can be generated with the aid of a smart card located in the self-service automat that is preferably deposited in a safe. By physically locating the smart card in the cash machine safe, unauthorized access to the smart card and manipulation thereof is made more difficult.

In one possible embodiment the peripheral component is a keypad or a disbursal unit, such as are used in cash machines. In what follows, one possible sequence with respect to a keypad is described. It is understood that similar or identical sequences are possible for other components of the self-service automat. The following example thus does not constitute a limitation.

The keypad has a sequence control system that allows plain text entry when the release signal is present. In order for the keypad to be in a defined status at a restart as well, the keypad switches to a mode that does not permit plain text entry if there is a power outage.

In addition, the user is shown that an entry is being made in plain text. In this for example, a light can be provided on the device, located next to the keypad or in the area of the keypad, that shows the user that data are being transmitted in an unencrypted form. As a result, in the event of a possible attack on the device, the user himself can recognize that he is entering a possibly unencrypted PIN, which indicates an inconsistency in the automat. It is also conceivable that, with an indication of inconsistency and the transmission of a corresponding signal, the keypad shuts down the entire system over an additional interface, to the power supply for example.

There are basically several time approaches that track a check of the control software through the secure domain.

In a first phase, before the control software is started, for example in the pre-boot phase, the control software on the data carrier is checked. The boot process is continued and the control software started only if the check is successful.

In the second phase, after the control software is booted, a process is initiated that checks the consistency of the control software during operation one time or cyclically. This process can be located inside the control software, for example a service in the Windows operating system, or a process that functions on a parallel operating system.

A further component of the invention is the self-service automat; said automat comprises a controller that is controlled by control software. In this instance it may be a conventional PC, for example, that is connected to external components over serial interfaces. A trustworthy domain is configured inside the PC as hardware, software or a combination of the two. As already explained above, the secure domain checks the control software for consistency. In the event of inconsistency, a blocking signal is transmitted to a peripheral component over a dedicated link or over a common main memory area. The component has a sequence control system that limits the functionality of the self-service automat and/or of the peripheral component.

A further component of the invention is a self-service automat keypad that has a sequence control system that permits plain text entry and an encrypted keypad entry. In this case, a signal input is given that can be structured logically or physically, wherein a sequence control system allows plain text entry only when a release signal is present at the signal input. With a logical signal input, an encrypted value or a signed value is transmitted over the standard communication channel, such as USB, RS232, etc. With a physical signal input, the transfer takes place over another channel.

BRIEF DESCRIPTION OF THE DRAWINGS

The following is an explanation of the Figures, which are described briefly and to which the following description of possible embodiments refers.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
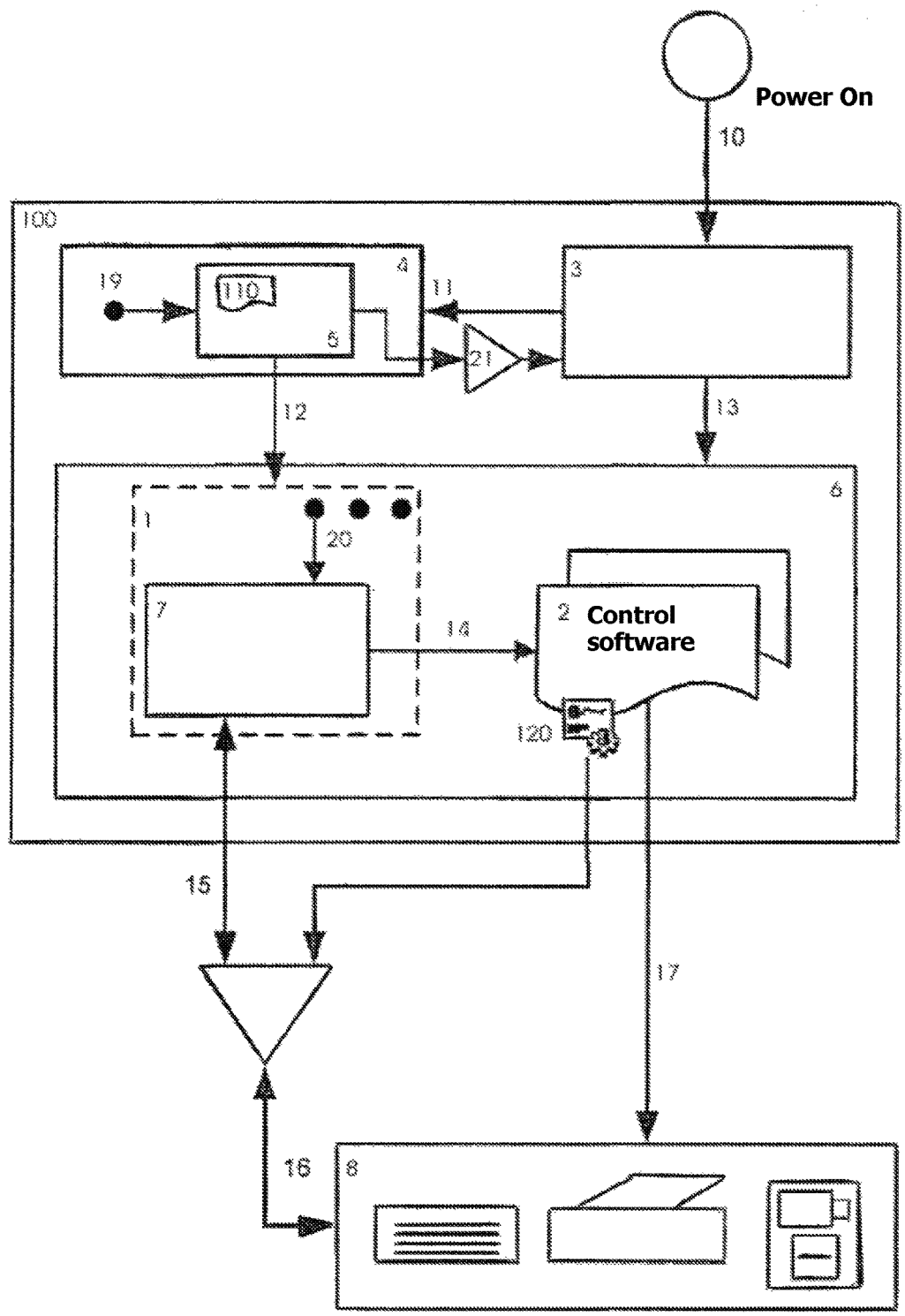
FIG. 1 shows a self-service automat with control software and a secure domain that is connected to an external device.

The basic idea is to create a trustworthy domain 1 on the PC controller, as shown in FIG. 1. The task of said domain is to check the control software 2, which is exclusively responsible for the smooth operation of a cash machine, for consistency. In the event that consistency or inconsistency is determined, a blocking or release signal for a peripheral component 8 is generated. For example, the signal can be used to release the keypad, or to block the dispensing controller and, connected to it, the cash dispenser. The release of the blocking signal is preferably generated by a smart card that is housed in the cash machine safe, secured against manipulation. Characteristic of the solution is a graduated check for integrity during a pre-boot phase and the actual operating phase. The graduated check is intended to achieve enhanced performance.

A further especially hardened operating system on Unix Base 4 is installed on the controller 100 in addition to the actual Windows operating system 6. In computer technology, hardening is understood to mean increasing the security of a system by using only dedicated software that is necessary to operate the system, the correct sequence of which can be guaranteed from a security perspective. The intent is to provide better protection for the system against external attacks as a result. The German Federal Office for Information Security describes hardening in IT security "[. . . ] the deletion of all software components and functions that are not absolutely necessary for the program to fulfill its intended object." [2].

The object is to create a system that can be used by numerous persons, even those less trustworthy. For example, for Gentoo Linux there is the hardened project that combines a core version as well as additional system services with which a secure Linux system can be provided even for outside users. Other operating systems are conceivable. The idea behind this solution is to check in a first step in a pre-boot phase a few files that are responsible for the characteristics of the domain 1. These files thus represent a process that is started if Windows was started. The check is particularly advantageous due to a malware-resistant instance. Additionally, this first instance can be checked using mechanisms from the Trusted Computing concept. A further advantage is that the pre-boot phase is speeded up since only a few files are checked. The boot sequence is controlled, for example, by a standard boot loader 3, but can also be specified by the computer BIOS. The latter will load the Unix-based system after power On 10. A daemon 5 is started in an initialization process 19 that checks 12 all files assigned to the domain 1 for consistency 50 using a list 110. In the event of a positive check, a signal 21 is set for the boot loader, on the basis of which the Windows operating system is started 13 in a second step. In the event of an inconsistency, the boot process is terminated.

After the second boot phase, specific services are started through the Windows operating system. One service 20 starts a check sum program 7 that checks the consistency of the control software 2. The check can take place one time before the actual operating phase of the cash machine and then cyclically in the operating phase. Or a check takes place solely in the operating phase. In the case of the latter, it is advantageous with an identified inconsistency for the operation of a component to be limited or even deactivated. It is particularly advantageous if the control software is equipped with a certificate. The certificate can be checked against a key that is deposited in the security domain 1. As an option, mechanisms from the Trusted Computing concept can also be used here, in which a corresponding crypto chip is located on the mother board of the computer.

Figure 2:
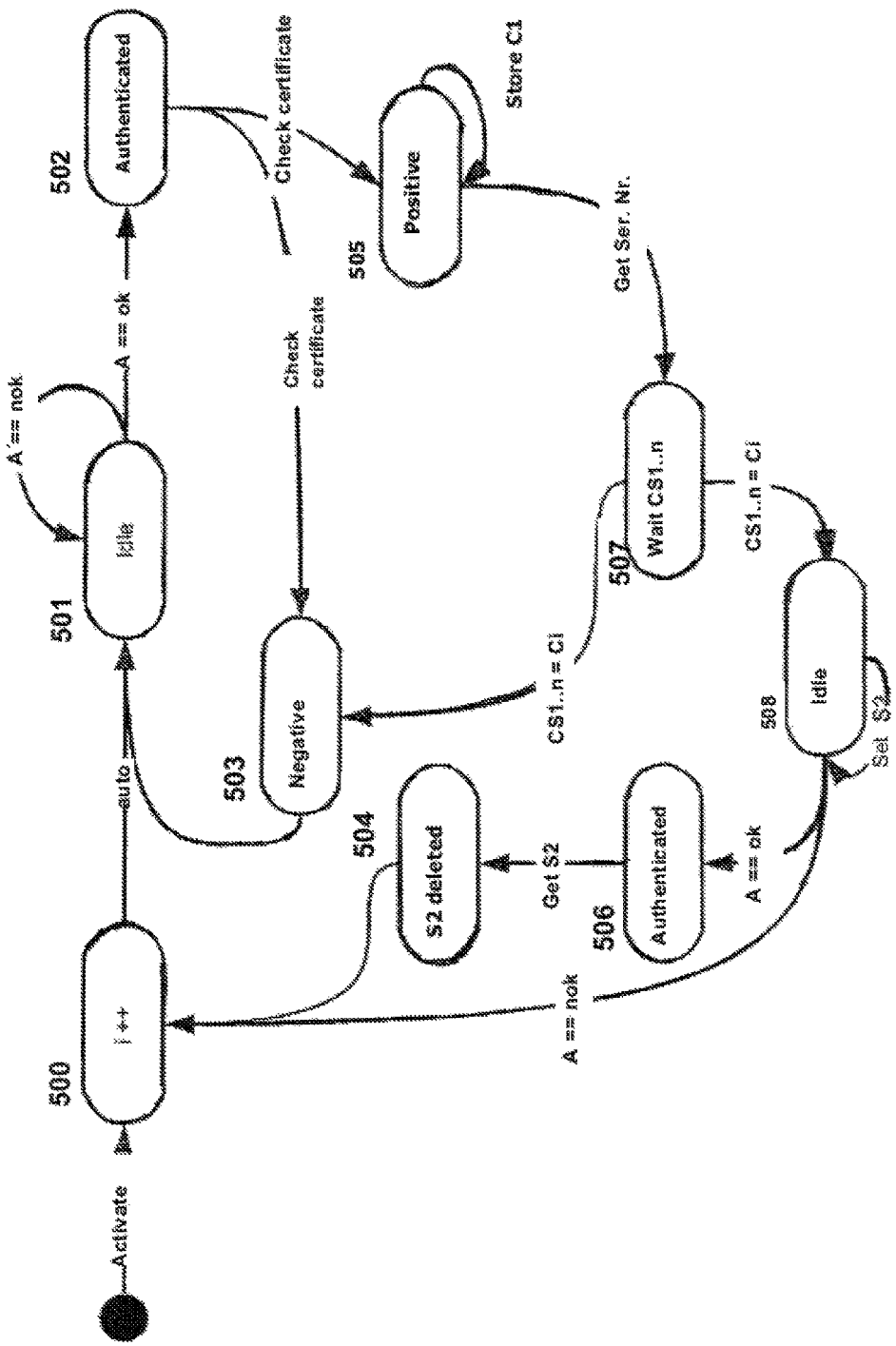
FIG. 2 shows a state machine of a chip card that administers the check sums of the control software

More advantageous is a check by a smart card 9 that is stored in the cash machine safe. The smart card contains a protective mechanism that protects against the reimporting of old check sums 15, refer to embodiment (FIG. 2). Furthermore, the smart card has a mechanism that generates a signal in the event of a positive or a negative certificate check. In addition, the card has one secret that it shares with a peripheral component 8, and an additional one that it shares with the check sum program 7. Encrypted security protocols 15, 16 can be implemented by way of these secrets. With inconsistent control software, the signal can be used to deactivate the PIN entry keypad for example. It is also conceivable that the entire automat can be shut down or other components deactivated.

One embodiment is shown using FIG. 2. The introduction of invalid check sums into the system must be prevented. Checks sums generated by an unauthorized person are detected in the system because of authentication mechanisms such as digital signatures and then rejected. The loading of old signature states is detected by suitable metadata such as ascending serial numbers.

Said serial numbers are generated by the chip card for example, stored and checked. Processes from the state of the art can be used here (challenge-response procedure).

The authentication check of the check sum(s) is supported or secured by the chip card. Such measures prevent the importation of manipulated check sum data, the manipulation or re-importation of individual check sums and the manipulation or re-importation of complete sets of check sums for the entire system.

The state machine of a chip card outlined here as an example prevents the re-importation of check sums and, associated with it, a re-generation of a release or blocking signal. After activation, state 500, an internal counter is incremented and stored persistently. State 501, the card waits for authentication of the check sum program (7(A')). State 502, with positive authentication the instance is authenticated and the certificate check can be carried out. State 503, there is no negative authentication.

In state 505 there is a positive certificate check, an item of check sum information is taken from the certificate and buffered.

The card releases the current counter status which is returned by 7 to the card for the following check of the check sums. State 507, the card is waiting for the check sum (n)/counter status that 7 has determined.

State 508, following positive check of information I, CI and CS1 . . . n, an item of release or blocking information (S2) is generated and waits for authentication of the instance (8(A'')).

State 506, with positive authentication the instance is authenticated and signal S2 can be queried. State 504, in this state signal S2 is deleted and the counter status is automatically incremented.

Figure 3:
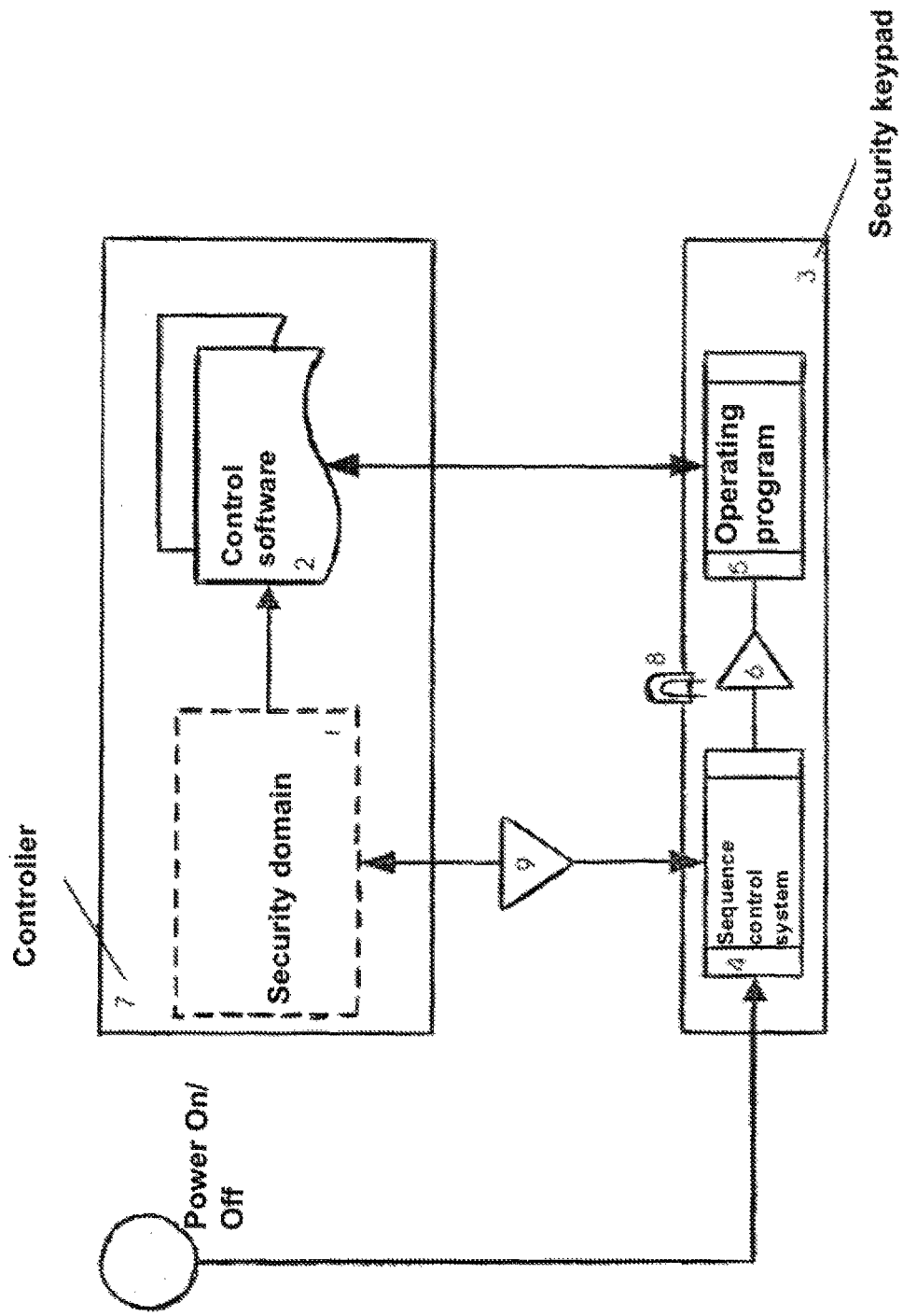
FIG. 3 shows a self-service automat with a keypad having a sequence control system.
Figure 4:
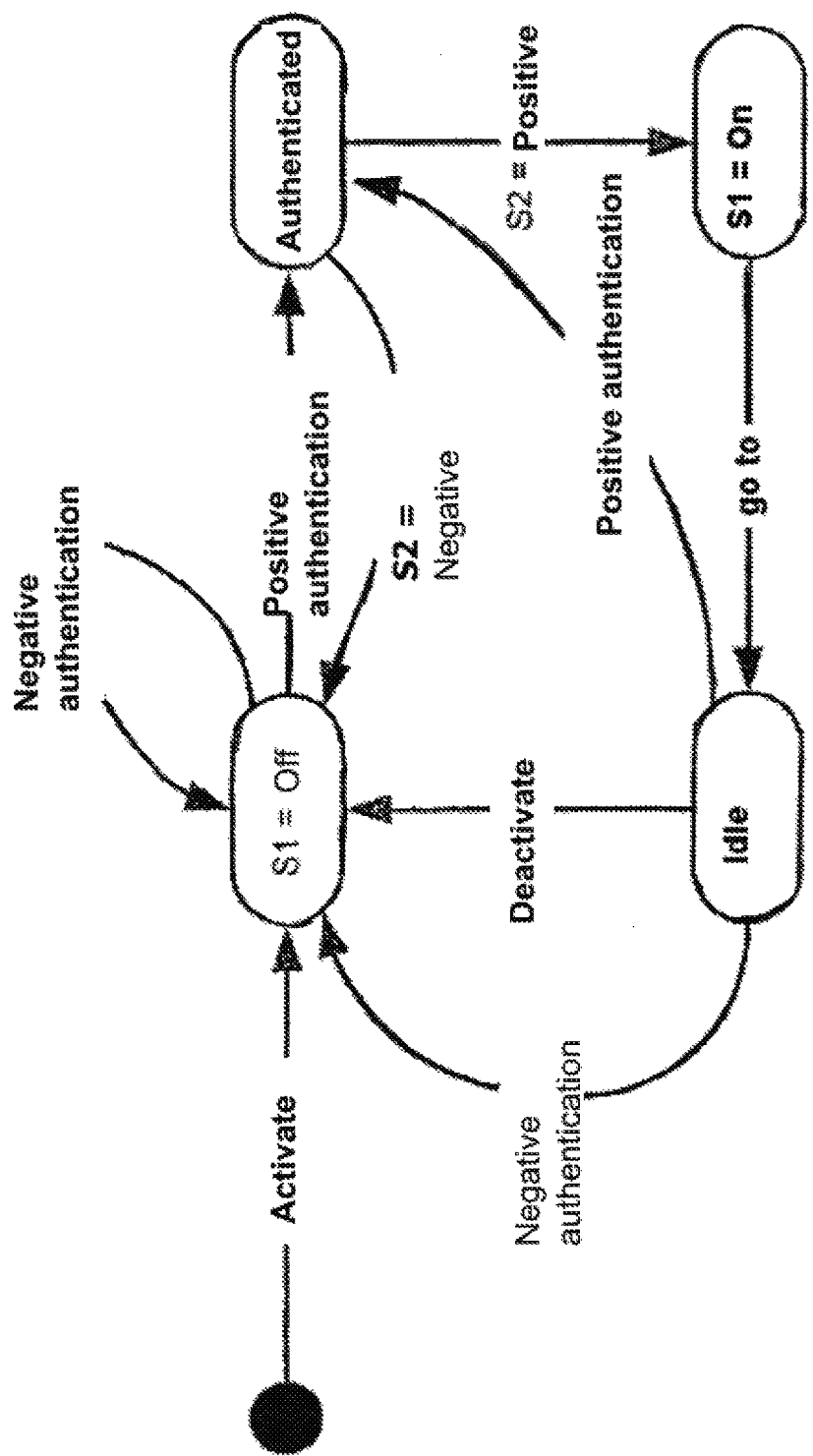
FIG. 4 shows a state machine of the sequence control system.

In FIG. 3 the combination of the self-service automat and the keypad is again examined more closely. The security keypad 203 possesses, in addition to the operating program 205, a sequence control system 204 that sets a signal S1 206 or the operating program. If the operating program recognizes that S1 is set, plain text entry is permitted. In addition, through signal S1 206 that was set, an LED 208, for example, can be activated and thus signal a consistent control program. The signal is set only when a security domain 201 has checked the integrity of an application 202 on the controller 207 and sends a signal S2 209 to the sequence control system 204. With power Off and power On, signal S1 206 drops back. The latter is intended to guarantee that the operating program for the keypad always prohibits plain text entry after activation. The signal S2 209 is preferably embedded in a security protocol to prevent what are known as replay attacks. The security protocol can be taken from the state of the art.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A process for controlling a self-service automat, comprising the steps:
    operating a security key pad that includes an operating program and a sequence control system, wherein the operating program alternatively operates the security key pad in either a security mode or a plain text mode, and wherein the sequence control system controls the operating program to control the mode of the security key pad;
    directing commands to the operating program over a first link from a first operating system running on a processor of the self-service automat;
    checking the first operating system for consistency using functionality of a second hardened operating system and without using functionality of the first operating system, wherein the second hardened operating system is running on separate hardware relative to the first operating system, and wherein the separate hardware comprises a processor plug-in card located in a housing of the self-service automat;
    in the event of an inconsistency, the second hardened operating system generates a blocking signal and sends the blocking signal to the sequence control system over a second link that is distinct from the first link, and the sequence control system prevents the operating program from operating the security key pad in the plain-text mode in response to receiving the blocking signal.

2. The process according to claim 1, wherein;
    in the event of a consistency, the second hardened operating system generates and sends a release signal to the sequence control system over the second link that causes the sequence control system to permit the operating program to operate the security key pad in the plaintext mode.

3. The process according to claim 2, wherein the second hardened operating system generates the release signal and/or the blocking signal with the aid of a smart card that is deposited in a safe located in the self-service automat.

4. The process according to claim 1, wherein the first operating system is checked in a pre-boot phase and/or wherein a process is started after the booting of the first operating system that checks the consistency of the first operating system one time or cyclically during operation.

5. The process according to claim 1, wherein the first operating system is equipped with a certificate and wherein the certificate is checked by the second hardened operating system in order to determine whether the first operating system is corrupt.

6. A self-service automat comprising:
    a security key pad that includes an operating program and a sequence control system, wherein the operating program alternatively operates the security key pad in either a security mode or a plain text mode, and wherein the sequence control system controls the operating program to control the mode of the security key pad;
    a first operating system running on a processor of the self-service automat for controlling the self-service automat, wherein the first operating system directs commands to the operating program over a first link;
    a second hardened operating system running on separate hardware relative to the processor, wherein the separate hardware comprises a processor plug-in card located in a housing of the self-service automat, wherein the second hardened operating system checks the first operating system for consistency without using functionality of the first operating system, wherein the second hardened operating system generates and sends, in the event of an inconsistency, a blocking signal to the sequence control system over a second link that is distinct from the first link, and wherein the sequence control system prevents the operating program from operating the security key pad in the plain text mode in response to receiving the blocking signal.

7. The self-service automat according to claim 6, wherein the sequence control system is configured in such a way that, in the event of consistency, the sequence control system receives a release signal from the second hardened operating system over the second link, and the sequence control system permits the operating program to operate the security key pad in the plain text mode in response to receiving the release signal.

8. The self-service automat according to claim 7, wherein the processor plug-in card processes the release signal and/or the blocking signal.

9. The self-service automat according to claim 6 further comprising:
    an optical and/or acoustic signal generator that is activated when a plain text entry is being made.

10. The self-service automat according to claim 6, wherein the first operating system is checked in a pre-boot phase and/or by a process that is started after the first operating system is booted, which checks the consistency of the first operating system one time or cyclically during operation.

11. The self-service automat according to claim 6, wherein the first operating system is equipped with a certificate and wherein the certificate is checked by the second hardened operating system in order to determine whether the first operating system is consistent.

12. A self-service automat comprising:
a security key pad that includes an operating program that alternatively operates the security key pad in either a security mode or a plain text mode, wherein the security key pad also includes a sequence control system that controls the operating program to control the mode of the security key pad;
wherein the sequence control system comprises a signal input and permits the operating program to operate the security keypad in the plain text mode only when a release signal is present at the signal input;
a processor of the self-service automat running a first operating system for controlling the operating program over a first link;
a second hardened operating system running on separate hardware relative to the processor, wherein the second hardened operating system comprises a processor plug-in card located in a housing of the self-service automat, wherein the second hardened operating system checks the consistency of the first operating system without using functionality of the first operating system, and wherein the second hardened operating system generates and sends the release signal to the sequence control system over a second link that is distinct from the first link after the second hardened operating system verifies the consistency of the first operating system.

13. The self-service automat according to claim 12, further comprising:
an optical and/or acoustic signal is issued for the user over a signal output when a plain text entry is being made.

14. A process for controlling a self-service automat, comprising the steps:
operating a security key pad that includes an operating program and a sequence control system, wherein the operating program alternatively operates the security key pad in either a security mode or a plain text mode, and wherein the sequence control system controls the operating program to control the mode of the security key pad;
directing commands to the operating program over a first link from a first operating system running on a processor of the self-service automat;
checking the first operating system for consistency using functionality of a second hardened operating system without using functionality of the first operating system, wherein the second hardened operating system runs on separate hardware relative to the processor, and wherein the separate hardware comprises a processor plug-in card located in a housing of the self-service automat;
in the event of an inconsistency, the second hardened operating system generating a blocking signal and sending the blocking signal to the sequence control system over a second link that is distinct from the first link, wherein the blocking signal is generated with the aid of a smart card that is deposited in a safe located in the self-service automat, and wherein the sequence control system prevents the operating program from operating the security key pad in the plaintext mode in response to receiving the blocking signal;
in the event of a consistency, the second hardened operating system generating and sending a release signal to the sequence control system, wherein the sequence control system permits the operating program to operate the security key pad in the plaintext mode in response to receiving the release signal.

15. The process according to claim 14, wherein the sequence control system permits the operating program to operate in the plain text mode only when the release signal is present.

16. The process according to claim 15, further comprising:
an optical and/or acoustic signal is issued, perceptible to the user, when a plain text entry is being made.

17. The process according to claim 14, wherein the first operating system is equipped with a certificate and wherein the certificate is checked by the second hardened operating system in order to determine whether the first operating system is corrupt.

18. A self-service automat comprising:
a security key pad that includes an operating program and a sequence control system, wherein the operating program alternatively operates the security key pad in either a security mode or a plain text mode, and wherein the sequence control system controls the operating program to control the mode of the security key pad;
a processor of the self-service automat running a first operating system for controlling the operating program over a first link;
a second hardened operating system running on separate hardware relative to the processor, wherein the separate hardware comprises a processor plug-in card located in a housing of the self-service automat, wherein the second hardened operating system checks the first operating system for consistency without using functionality of the first operating system, and wherein the second hardened operating system generates, in the event of an inconsistency, a blocking signal and/or generates, in the event of consistency, a release signal;
wherein the sequence control system has means to receive the blocking signal and/or the release signal from the second hardened operating system over a second link that is distinct from the first link, wherein the sequence control system is configured in such a way that, when the sequence control system receives the release signal, the sequence control system permits the operating program to operate in the plaint text mode and in response to receipt of the blocking signal, the sequence control system limits the operating program to operating in the security mode.

19. The self-service automat according to claim 18, wherein the sequence control system permits the operating program to operate in the plain text mode only when the release signal is present.

20. The self-service automat according to claim 19, further comprising:
an optical and/or acoustic signal generator is provided for the user that is activated when a plain text entry is being made.

21. The self-service automat according to claim 20, wherein the first operating system is checked in a pre-boot phase and/or by a process that is started after the first operating system is booted, which checks the consistency of the first operating system one time or cyclically during operation.

22. The self-service automat according to claim 18, wherein the first operating system is equipped with a certificate and wherein the certificate is checked by the second hardened operating system in order to determine whether the first operating system is consistent.

* * * * *